April 20, 1965     Z. LORENIAN     3,178,769

MACHINE FOR FABRICATION OF MOLDABLE MATERIAL

Filed Nov. 22, 1960     6 Sheets-Sheet 1

INVENTOR
ZAREH LORENIAN
by Curt M. Avery
Attorney

April 20, 1965 Z. LORENIAN 3,178,769
MACHINE FOR FABRICATION OF MOLDABLE MATERIAL
Filed Nov. 22, 1960 6 Sheets-Sheet 2

INVENTOR:
ZAREH LORENIAN
by Curt M. Avery
Attorney

United States Patent Office 3,178,769
Patented Apr. 20, 1965

3,178,769
MACHINE FOR FABRICATION OF
MOLDABLE MATERIAL
Zareh Lorenian, Blucherstr. 20 II, Dusseldorf, Germany
Filed Nov. 22, 1960, Ser. No. 71,027
Claims priority, application Germany, Nov. 28, 1959,
L 34,842; May 25, 1960, L 36,227
5 Claims. (Cl. 18—12)

My invention relates to methods and machines for producing intermediate or finished products by mixing, masticating and shaping of pulverulent, granular, pasty, viscous or liquid substances in a single continuous operation, particularly but not exclusively thermoplastic and thermosetting substances of synthetic or natural origin.

It is known to use single and multiple screw extrusion presses for converting granular or pulverulent thermoplastic synthetic substances into intermediate and finished products. It is likewise known to use die-casting machines, alone or together with screw presses, for producing products from such synthetic substances.

Screw presses have also been used for working natural and synthetic rubber. These materials are charged into the screw press in form of lumps, ground or cut pieces, preheated to suitable temperatures and worked, and are vulcanized after leaving the extrusion head or nozzle of the machine.

For making products from thermosetting synthetic substances mechanical and hydraulic presses are used. For thus producing tubes and profiled bodies by means of extrusion presses or screw presses, the thermosetting synthetic substances are compressed, preheated to suitable temperature and are forced out of the press through a suitably long nozzle in which they assume the suitable hardening temperature.

It is further known that for the production of tubes and profiled parts from non-ferrous metals, such as lead, tin, zinc, aluminum, copper or bronze, the metal is first melted and subsequently extruded through a nozzle whose temperature is graduated down to a lower temperature than that of the molten metal.

For working, namely mixing, kneading, homogenizing and coloring, of synthetic or other doughy or pasty substances, heated or cooled kneading machines, friction mixing rollers and calenders are used. These machines are expensive and their operation is time-consuming.

The machinery and plants used for the production of artificial ice, artificial snow, ice cream and half-frozen products, are likewise expensive and the manufacture of such products consumes a considerable amount of time.

All the above-mentioned machines and presses and methods leave much to be desired, especially in the case of working synthetic substances with screw presses.

Up to the present, the problem of working thermoplastic synthetic substances with screw presses has not been solved satisfactorily and the working of synthetic substances with such screw presses is accompanied by considerable technical difficulties. For example, when feeding the thermoplastic synthetic substances through the extrusion press, the effective rate of feed, especially in the case of single-screw presses, is much lower than the theoretical rate of feed. The actual or effective rate of feed is still lower when working pulverulent synthetic substances, especially when working pulverulent untreated hard polyvinylchloride (PVC) or softener-free PVC and, above all, when working pulverulent softener-free emulsion-polyvinylchloride which has not undergone previous treatment by the dry blend process.

Die-casting or injection-molding machines have disadvantages when the plastification of the synthetic substance in the machine cylinder is to be rapidly completed, as is desired for die-casting machines which advance relatively large quantities of synthetic substances with one stroke of the piston. For that reason, additional screw presses have been attached to the die-casting machines for pre-plasticizing the synthetic substances before feeding them into the die-casting machine proper.

It is also known to use rotary hydrostatic gears for feeding water, oil and other liquids or gases. The hydrostatic gears, pumps and blowers of the known designs could not heretofore be used for feeding pulverulent substances, especially pulverulent or granular synthetic substances, because pumps or blowers intended for feeding pulverulent or granular synthetic substances must not constrainedly feed with a relatively low number of revolutions and with an effective rate of feed approximately equal to the theoretical rate, but must also overcome the very heavy back pressure caused by introduction of the synthetic substance into the passages and casting head or nozzle, which pressure may be 200 to 2000 atm. per cm.²  and more.

It is an object of the method and apparatus according to my invention, hereinafter described, to completely overcome the above-described disadvantages and imperfections of the known machines, plants and devices, especially of the screw presses and die-casting machines.

More specifically, it is an object of the invention to work any desired quantities of organic or inorganic pulverulent, granular, pasty, viscous and liquid substances, especially thermoplastic and thermosetting synthetic and natural substances, in the shortest possible period of time, continuously in a single working operation with optimum efficiency and minimum space requirement and along the shortest feasible path. It is also an object to feed these substances uniformly at a high effective rate and very high pressure, and, if necessary, to compress, stretch and to plasticize these substances by application of heat and/or cold, or to cause them to gel or bring them to a stable consistency. A further object is to perform, in the same above-described working operation, such additional processing steps as mixing, kneading, homogenizing, or coloring, degasifying or vapor-drying the substance, and directly following the same working operation, to shape the substance by means of extrusion or die-casting heads or nozzles to form intermediate or finished products, for example granulates, tubes, hoses, profiled bodies, plates, foils, hollow and solid bodies and the like, without subjecting the substance to disintegration or excessive mechanical stressing so that it retains its desired physical and mechanical properties.

According to the invention, one of the above-mentioned substances is introduced in one of the non-plastic forms above mentioned and in cold or preheated state, into a stationary heatable or coolable apparatus which comprises a first portion A with an inlet opening and a second portion B with an outlet, both portions being joined to form a single continuous processing space into which the substance is fed through an inlet opening of the first portion and which it leaves at the end of the second portion. The first portion comprises a rotary positive-displacement structure of continuous operation whose structurally closed positive displacement spaces constrainedly feed the substance in accurately predetermined quantities toward and into the second portion of the combined processing space under high pressure, for example 200 to 2000 atm. and more, according to the back pressure or resistance of the substance at an effective rate of feed approximately equal to the theoretical rate of feed. During this feeding movement, if necessary, the substance is compressed, degassed, deaerated and/or vaporization-dried, depending upon the purpose and the kind or nature of the substance. During feeding, the temperature of the substance in the first portion A is kept under control. That is, the substance is either maintained at its original temperature, or is heated or cooled, as may be required. On leaving the outlet aperture of the first portion, the substance is introduced into the heatable and coolable second part B of the apparatus directly communicating with the part A. The substance, during its travel in part B is maintained under pressure so as to be fed through the narrow axial and/or radial cavities, such as slits, spaces or bores, in part B of the apparatus. Depending upon the purpose and kind of the substance, it is kept at regulated temperature while being conveyed through the narrow recesses or cavities. This is done by heating and/or cooling so as to bring the substance into plastic, viscous, liquid or consistent state in the shortest possible period of time, and to keep it at the same temperature up to the outlet aperture of the second part B of the apparatus. During the stage just mentioned, the substance, if necessary, is further degassed and dried by evaporation. According to the desired purpose and the nature of the substance, it is pressed with the same pressure during its passage through the above-mentioned narrow recesses by means of kneading, mixing and homogenizing baffle elements which form between them, and one behind the other, constricted passageways as hereinafter described. By means of these elements the travelling substance is constricted and unequally distributed, then again unequally united, deflected and carried along. As a result, the substance is thoroughly kneaded, intimately mixed, homogenized, if necessary colored and, on leaving the outlet aperture of part B of the apparatus, is directly converted into intermediate and finished products by extrusion from nozzles during the same operation. The substance can also be fed directly into a calender on leaving the outlet aperture of part B of the apparatus. It is advantageous to have the streams of substance again united along an elongated path after leaving the constricted passageways.

The foregoing references to heat control of the substance by heating refer to thermoplastic or thermosetting organic or inorganic substances, especially synthetic or natural substances or to non-ferrous metals which must be subjected to pressure and heat in order to become plastic, viscous or liquid, or are caused to gel.

The foregoing references to heat control by cooling refer to substances which require the application of pressure and cold to convert into a plastic state or shape-retaining consistency, for example in the production of artificial snow, ice, ice cream and semi-frozen products. The water for the ice or the viscous or liquid mixture of ice cream while being fed through the very narrow or thin recesses in the part B of the apparatus, is cooled to minus 40 to minus 100° C., depending upon the feeding rate of the substance. Such cooling may be applied, for example, by circulating cold brine or other coolant in proximity of the recesses or cavities, so that these substances gradually freeze and have the desired consistency or shape when leaving the outlet aperture of part B of the apparatus.

In the working cycle, no pulsations can occur during extrusion or molding of the intermediate and finished products because the substance is positively and continuously fed under very high pressure. For the same reason the extrusion or injection nozzles, especially for the synthetic substances, can be made far longer than usual. These long nozzles can be cooled gradually in the direction towards the outlet aperture. As a result, the intermediate or finished products can be so compressed that they have a higher strength factor and can pass out of the nozzle in sufficiently calibrated and cooled condition to eliminate in many cases the need for further calibration, this being another advantage of this method.

A plurality of similarly constructed and operated hollow spaces is generally provided for part A of the apparatus. Fundamentally, however, part A of the apparatus can be operated with at least one rotary hollow space so that hereinafter only one hollow space will be referred to although a plurality of similarly driven and constructed hollow spaces may be provided in each case.

In one embodiment of the invention the positive-displacement space receiving the substance is formed and closed-off by at least one element feeding the substance which is radially shiftable in a rotary inner cylinder, the peripheral surface of which is eccentric to the axis of the outer cylinder surrounding it.

In another embodiment of the invention, in order to give the part A a concentric design, an inner cylinder is rotatably arranged in an outer cylinder provided with inlet and outlet apertures and has on its periphery at least one hollow space for the reception of the substance. The space is sealed off from the inner wall of the outer cylinder by sealing edges or conveying elements provided on the periphery of the inner cylinder. Preferably a stripper serving as such a conveying element is provided on the outlet aperture and is pressed in substantially radial direction into sliding engagement with the outer wall of the inner cylinder and the contours of the hollow space. This embodiment is characterized by its simple and particularly reliable construction.

According to still another embodiment of the invention, the part A has an inner cylinder rotatably and concentrically mounted in an outer cylinder provided with inlet and outlet apertures; and the periphery of the inner cylinder is provided with at least one hollow space for receiving the substance, in which space a slide-like segment is movably mounted, by means of which the substance can be pressed out of the hollow space into the outlet aperture.

In another embodiment the part A is composed of at least two separate pinch rollers or cylinders arranged substantially parallel, side by side, the substance is introduced through at least one inlet aperture into the hollow spaces. The two cylinders are rotatable in opposite directions respectively in such a manner that their surfaces meet along a line. The substance is positively advanced toward the pinch area of the rotating cylinders, where it is pressed by means of specially arranged strippers into the common outlet aperture and into the adjacent inlet aperture of part B of the apparatus.

Another modification concerns the baffle elements of part B. The substance can be conveyed between a large number of rotary rows of baffle elements and passages, or a large number of rotating rows of baffle elements and passages, having between them rows of stationary elements and constricted passages. The peripheral rotation can be in either direction and at any speed, depending upon the particular processing conditions and the properties of the substance.

Other improvements and embodiments of the invention are hereinafter explained with the aid of the attached drawings showing several examples of machines according to the invention, it being understood that the drawings are not intended to restrict the desired scope of protection since the invention can be incorporated in embodiments other than particularly illustrated and described herein.

Reference numerals below 100 are used in FIGS. 1 to 16, and numerals above 100 in FIGS. 17 to 20. The embodiments shown in FIGS. 21 to 22A bear references commencing with 201. The embodiments of FIGS. 23 to 26 are provided with reference numerals commencing with 301.

Figures 1, 2, 9, 10, 11, 12, 13, 14, 15, 16:
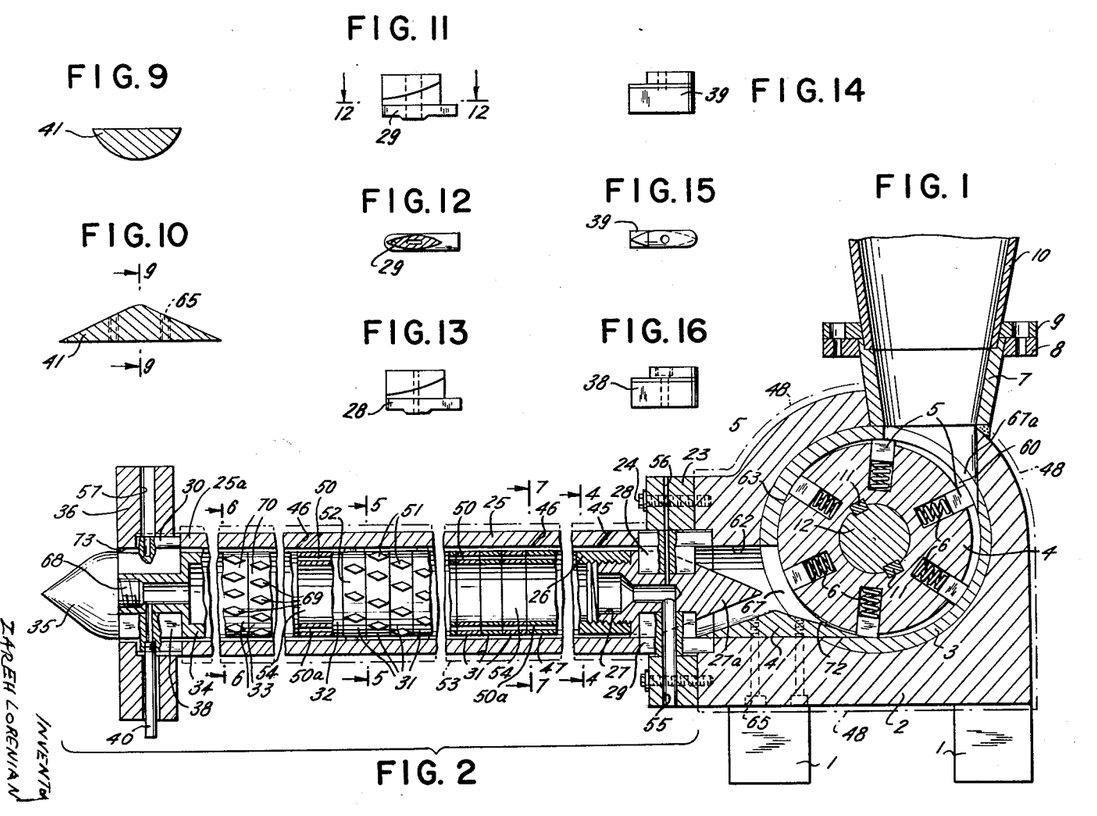
FIG. 1 is a section of part A of the apparatus for feeding the substance, especially synthetic and natural substances, the section being taken on line 1—1 of FIG. 3; this part of the apparatus feeds, compresses, if necessary degasses, deaerates and converts the substance, if necessary under the influence of heat or cold, to a somewhat plastic consistency.
FIG. 2 is a longitudinal section through part B of the apparatus, in which the substance is pressed into final plastic state by the influence of heat and cold and, according to the nature of the substance, is intimately mixed, thoroughly kneaded, homogenized possibly colored, degassed, deaerated and evaporated.
FIGS. 9 and 10 are a longitudinal section and a cross section respectively of the baffle means for deflecting and reversing the flow of substance in the part A of the apparatus shown in FIG. 1.
FIGS. 11, 12, 13 are a cross section and longitudinal sections of the spacers or bridge structures 38 and 39 at the inlet aperture in part B of the apparatus.
FIGS. 14, 15, 16 show a cross section and longitudinal sections of the spacers or bridge structures 38 and 39 at the outlet aperture in part B of the apparatus.
Figure 3:
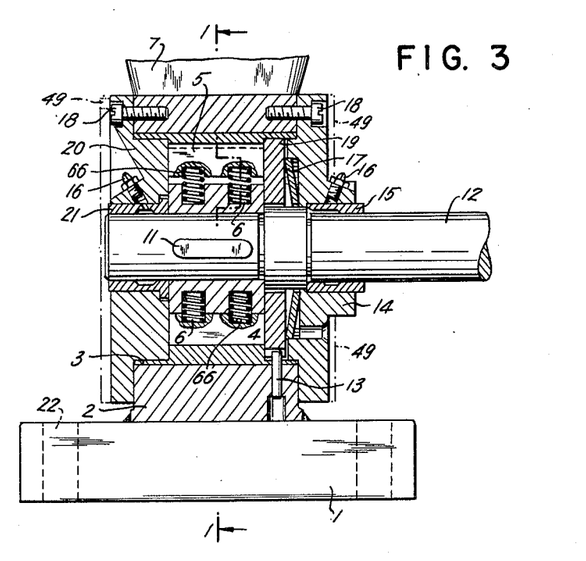
FIG. 3 is an axial section of part A of the apparatus of FIG. 1.

The part A of the apparatus, according to FIGS. 1, 3 has at least one inlet 7 and at least one outlet aperture 62 and is provided with a hopper 10 attached by means of flanges 8, 9 and bolts. The part A of the apparatus comprises two cylinders arranged one within the other and designated by 2 and 4 in FIGS. 1 and 3. The source of driving power is not shown.

The part A of the apparatus is provided with two foot supports 1 to permit fixing the apparatus on a table or plate. This part A of the apparatus can be cooled or heated by known cooling jacket means as shown at 48, 49.

The outer cylinder 2 is internally hollow, ring-shaped and stationary. The inner bore of the outer cylinder can be provided with an inner ring 3. The internal diameter of this ring may have an eccentric recess or cavity at the inner wall, like the ring 3 in FIG. 1, or it may be uniformly round on the inside like the ring 107 in FIG. 18.

The rotatable inner cylinder 4 has an outer diameter smaller than the inner diameter of the ring 3 or than the inner diameter of the outer cylinder 2. This inner cylinder is eccentric to the longitudinal axis and to the internal diameter of the ring or outer cylinder. The inner cylinder is arranged eccentrically in relation to the internal diameter of the ring 3 or the internal diameter of the outer cylinder 2 to such an extent that a portion of the external diameter of the inner cylinder comes into close sliding contact with the internal diameter of the ring or outer cylinder as shown at 63, so that a crescent-shaped space or gap 60 is formed between the external diameter of the inner cylinder and the internal diameter of the ring or outer cylinder.

The hollow space 60 is tightly sealed by two lateral pressure and packing discs 19, 20. The crescent-shaped hollow space 60 can be shaped, according to the nature of the substance to be worked, so that the substance in passing through this space is not appreciably compressed in volume, once it has left the inlet area at 60 (FIG. 1) and thence travels to the outlet. The outer cylinder can be provided with degassing or venting apertures or elements.

The degassing or venting apertures or elements are not shown in the figures illustrating part A of the apparatus, because these apertures can obviously be arranged at any place in the part A of the apparatus. These apertures can operate automatically or under vacuum.

The inner cylinder is driven by a driving shaft 12 as shown in FIGS. 1 and 3. The driving shaft is prevented by keys 11 from rotating relative to the inner cylinder.

The inner cylinder 4 is provide with slots perpendicular to its longitudinal axis. The slots accommodate blades or sliders 5 which extend preferably over the entire width of the inner cylinder and move positively forward and backward in these slots perpendicularly to the longitudinal axis of the inner cylinder, thereby exerting a sucking effect. The blades are positively moved under the pressure of springs 6 which push them into the crescent-shaped space, according to the position of the blades. The blades are provided with bores 66 which guide the springs 6.

It is also possible to move these blades positively to and fro in these slots by hydraulic or pneumatic means.

The synthetic or natural substance is continuously introduced and/or pressed preferably perpendicularly to the longitudinal axis of the outer cylinder through at least one inlet aperture which may be provided with known stirring mechanism or the like, depending upon the kind of the substance to be processed. The substance then enters into the closed crescent-shaped hollow space 60 and, by the action of the rotating blades in the crescent-shaped hollow space, is positively forced and fed in the direction towards the outlet aperture under very heavy pressure and at a very effective rate of feed. Depending upon the nature of the substance, it is, if necessary, compressed, degassed or deaerated in the crescent-shaped space as above described. The substance is then forced through the outlet aperture 62, which is preferably arranged horizontally (parallel) to the longitudinal axis of the inner cylinder and is located between the point where the external diameter of the inner cylinder comes into contact with the internal diameter of the ring or outer cylinder as shown at 63 on the one hand, and a point where the crescent-shaped hollow space 60 is situated, on the other hand. Thus the substance passes from part A into the inlet aperture of the part B which is connected directly to the outlet aperture of part A of the apparatus.

The outlet aperture may be provided with deflecting or reversing devices or elements 41 in FIGS. 1, 9 and 10, and fixed with bolts 65 as indicated in FIG. 10.

The ring 3 or 107 is secured against turning by pins 13 (FIG. 3).

The driving shaft of the apparatus shown in FIGS. 1 and 3 is provided with bushings 15, 21 and grease nipples 16. A cover 14 closes the part A on the driving side. A plate spring 17 presses against the packing flange or disc 19 by means of the cover 14. Bolts 18 serve to attach the packing flanges or covers. Denoted by 22 are bores for the bolts for fixing the foot supports 1.

Figures 17, 20:
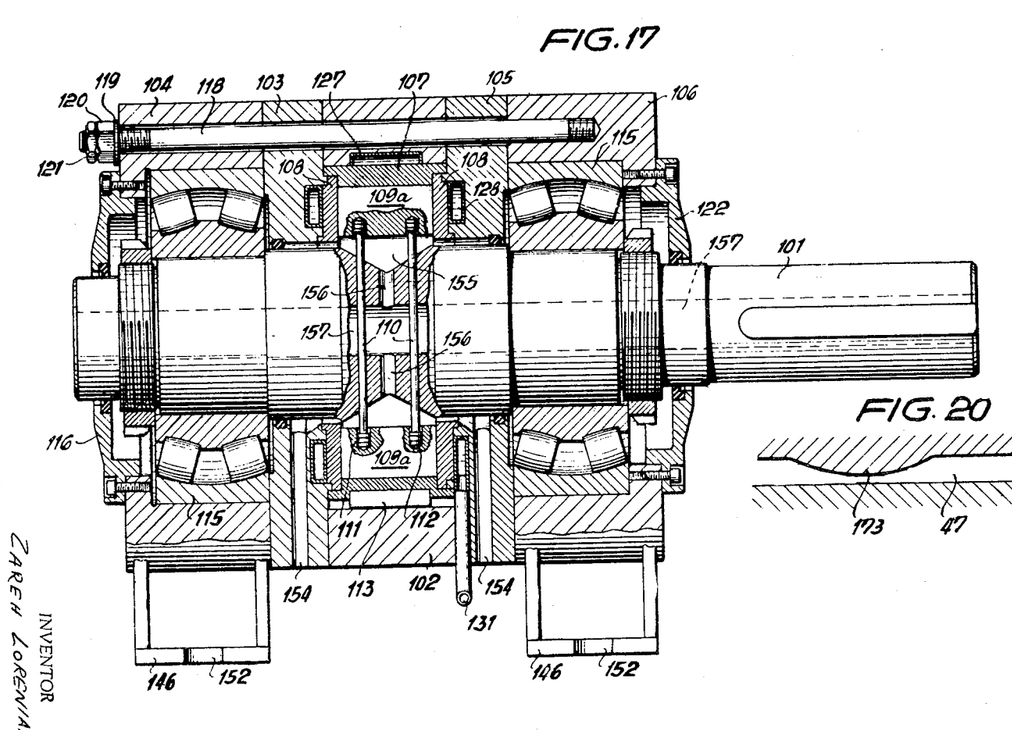
FIG. 17 is a modified longitudinal section of part A of the apparatus, the section being generally along the line 17—17 in FIG. 18, except that the rotating portion of the apparatus is shown in a different position.
FIG. 20 is a longitudinal section on a larger scale of one of the stretching and/or kneading locations in the hollow spaces shown in FIGS. 4, 5, 6, 7 and 8.
Figures 18, 19:
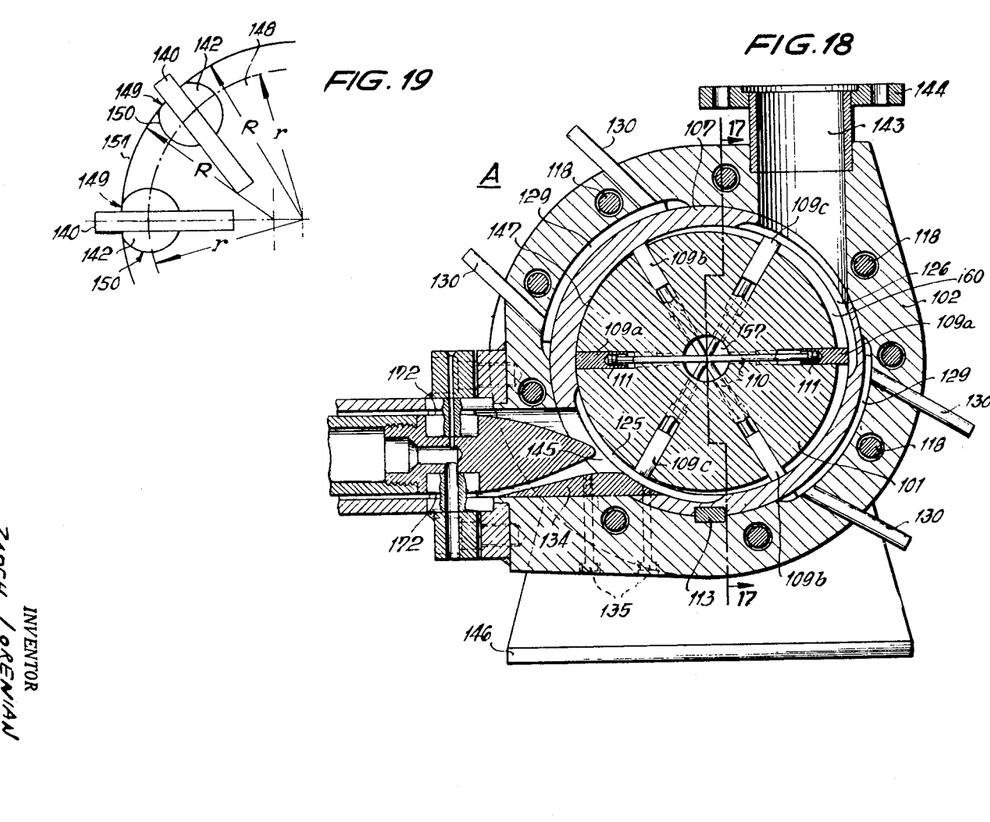
FIG. 18 is a cross section of the modified apparatus shown in FIG. 17.
FIG. 19 is a cross section through blades which are eccentrically guided by means of a cylindrical joint.

The modified pressure feeder portion A of the apparatus according to FIGS. 17 and 18 is largely similar to the one described above with reference to FIGS. 1 and 3 and, in principle, operates in substantially the same manner. Hence it will suffice to briefly describe the differences.

The pressure feeder portion of the apparatus shown in FIGS. 17 and 18 has an inlet 143 and an outlet 145. The inlet 143 is provided with a flange 144 for attaching a hopper as shown at 10 in FIG. 1. The inner cylinder 101 of the feeder portion, surrounded by the outer cylinder 102, is formed in one piece with the driving shaft. Attached to the outer cylinder are supporting feet 146. The feeder portion can be cooled or heated by conventional cooling means 127, 128, 129, constituted by coolant chambers with inlet and outlet pipes 130 (FIG. 18). The inner bore of the outer cylinder 102 is lined with a ring 107 which is prevented by a key bar 113 from turning. The outer diameter of the inner cylinder 101 is smaller than the inner diameter of the ring 107, and the inner cylinder is eccentric to the ring 107 to the extent required to have the inner cylinder come into close sliding contact with the ring 107 at 147 so that a crescent-shaped space is formed at 160.

The space 160 is sealed by two lateral packing discs 103 and 105 (FIG. 17). The shape of space 160 is such that the material is compressed by gradual and progressive narrowing of the hollow crescent space.

Slots 111 in the inner cylinder accommodate slider blades 109a, 109b and 109c. These blades are under the pressure of stiff pins 110 of which each holds a pair of blades in sliding contact with the inner cylinder. The pins can be provided with resilient means, such as natural or synthetic rubber springs, plate springs or spiral springs. The blades have bores 112 which guide the springs and/or the rigid pins 110.

The outlet opening of the pressure feeder is provided with a deflecting member 134 fixed by bolts 135 (FIG. 18).

The drive is journalled in roller bearings 115 (FIG. 17) which are covered by plates 104, 106, 116 and 122. The plates 104 and 106 are attached by bolts 118 which carry washers 119 and nuts 120, 121. The supporting feet 146 have bores 152 for attaching them to a foundation. The packing discs 103 and 105 according to FIG. 17 are provided with inserted pressure discs 108 which are hardened or have hardened or nitrated surfaces. Between the two discs 103, 105 and the insert discs 108 on the one hand and the driving shaft 101 on the other hand, a hollow space 153 (FIG. 17) is provided which communicates with a bore 154, so that any material as may penetrate between the blades and the discs 108 will pass out into the open through space 153 and bore 154.

The inner cylinder 101 of apparatus part A in FIG. 17, made in one piece with the driving shaft, has slots extending perpendicularly to the longitudinal axis. The slots have respective hollow bottom spaces 155 which communicate through bores 156 with the central bore 157 of the inner cylinder and driving shaft, so that any substance which may have penetrated between the slots and blades can drain through these hollow spaces and the central bore of the driving shaft, thus being prevented from impeding the movement of the blades in the slot.

As shown in FIG. 19, the blades 140 may be guided by cylindrical joints or hinges 142, the blades 140 being arranged to slide in the middle of the cylindrical hinges. The blades are arranged and secured eccentrically in the inner eccentric cylinder 148 and movable by known means. The outer surfaces 149 of the cylindrical hinges 142 are flush with the peripheral surface 151 of the inner cylinder 148 and have the same radius R as the latter surface. As the inner cylinder 148 rotates, and during the forward and backward rotary movement of the hinges in the cylindrical bores 150, no material, as may obstruct the movement of the hinges and blades, can enter between the hinges 142 and the cylindrical bores 150.

This construction is more complicated than the constructions of the apparatus part A according to FIGS. 1 and 3 and 18 and 17, and the feed pressure of the part A shown in FIG. 19 is less than in the constructions according to FIGS. 1, 3 and FIGS. 17, 18.

The blades or sliders extend positively into the arcuate hollow spaces 60 or 160 which contain material introduced through the inlet. While the inner cylinder rotates in the direction toward the outlet 62 or 145, the blades come into close sliding contact with the entire internal diameter of the ring or outer cylinder and thus positively press the substance out of the outlet 62 or 145 under very heavy pressure and at an extraordinarily effective rate of feed. At the point 63 or 147 the blades are entirely freed from the substance.

The two cylinders may be given any desired width and diameter, and any desired number of blades may be provided.

At least the surface of the blades, the inner cylinders, the pressure discs or insert discs which come into contact with the inner cylinder, and the inner surface of the outer cylinder or the ring which is arranged in the inner diameter or wall of the outer cylinder, should be preferably hardened or nitrated and/or hard nickel-plated.

Owing to the construction of the inner cylinder and the positively shiftable blades which can positively convey the material or substance under very high pressure and at a very effective degree of feeding, the inner cylinder and the blades of apparatus part A may be rotated at a very low number of revolutions per minute.

The part A of the apparatus can be composed of at least two parts A arranged directly side by side and independent of each other, the cylinders and blades of these parts A being separated by laterally arranged packing and pressure discs 19, 20 (FIG. 3) or 103, 105 (FIG. 17), the inner cylinders being rotated by the same driving shaft and their crescent-shaped hollow spaces so arranged and dimensioned that the substance on leaving the outlet aperture of the first part A is pressed laterally into the inlet aperture of the next part A arranged directly beside the outlet aperture of the first part A, and is fed in such a manner that the substance in the second part A is moved on and, if necessary, depending upon its nature, is further heated or cooled, compressed, degassed or deaerated.

Furthermore, the part A of the apparatus may comprise at least two vertically or horizontally arranged independent parts A of which one is connected directly following the other so that the substance on leaving the outlet aperture of the first part A is pressed directly into the inlet aperture of the second part A of the apparatus and, in this second part A of the apparatus, is moved on and, depending upon its nature, if necessary, is further heated or cooled and compressed. The inner cylinder of the second part A can rotate at the same speed as, or at a different speed from, the inner cylinder of the first part A.

If the length of the cavities and/or the length of the baffle elements of the part B turn out to be very great, due to the nature of the substance or its desired purpose and/or on account of a very high output being required, the part A of the apparatus may consist of two independent parts A the second of which is interposed between the cavities and/or the baffle elements of the part B and/or connected to the outlet of the part B ahead of the extrusion head or nozzles. This affords an additional increase in pressing and feeding pressure of the substance.

Rigid or elastic packings or segments may be provided between the blades and/or the slots in the inner cylinder in order to prevent penetration of the substance between these movable parts. Similarly, the lateral pressure discs which come into contact with the rotating inner cylinder may be provided with stiff or elastic packings or segments.

The blades, which run with the inner cylinder and penetrate under the pressure of springs and/or the pins into the crescent-shaped hollow space to maintain sliding contact with the internal diameter of the ring or outer cylinder, may show the tendency of jumping out of the inlet and outlet apertures for the substance. To prevent this, these apertuees are provided with guide elements or with thin guide rods 67 and 67a (FIG. 1) or 125 and 126 (FIG. 18) which prevent the blades from jumping yet allow the substance to enter and pass out freely.

To prevent the blades from tipping in the slots, the entire length of the blades is made much longer in relation to the longest part of the blades which penetrates to the deepest point of the crescent-shaped hollow space, the overall length being preferably three or more times longer than the part of the blades which penetrates to the deepest point of the crescent-shaped hollow space.

As mentioned above, the part B of the apparatus shown in FIG. 2, having at least one inlet aperture, is connected directly to the outlet aperture of part A by means of the flange 23 and the bolts 24, and preferably consists of a cylindrical stationary part which is also provided with at least one outlet aperture. Moreover the part B of the apparatus is heated and/or cooled by known means along its entire length or a portion thereof. The temperature of the part B is maintained under control by known means determined by its shape. For example, if part B is tubular, it will be heated and/or cooled from the outside and from the inside as shown at 53 and 54. The outlet aperture of part A or the inlet aperture of part B may be provided with means for deflecting or reversing the flow of substance as indicated by 41 in FIGS. 1, 9 and 10 and by 134 in FIG. 18, so that the substance being pressed out of the outlet aperture of apparatus part A is uniformly distributed and forced centrally into the inlet aperture of part B.

Figures 4, 5, 6, 7, 8:
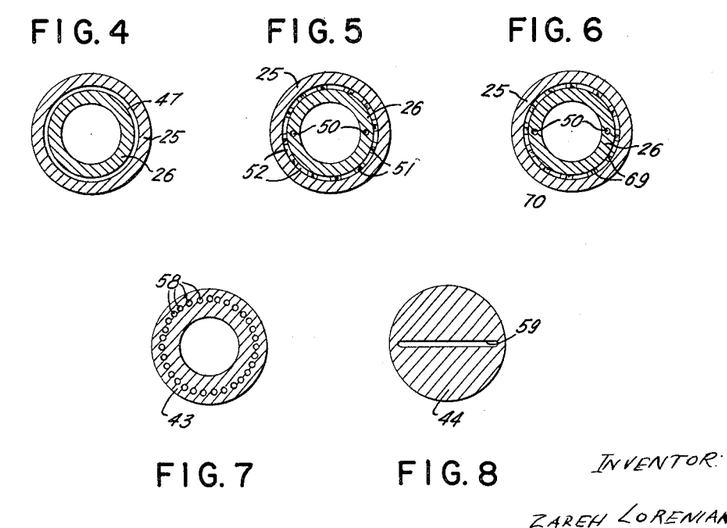
FIG. 4 is a cross section on line 4—4 in FIG. 2.
FIG. 5 is a cross section on line 5—5 of FIG. 2.
FIG. 6 is a cross section on line 6—6 of FIG. 2.
FIG. 7 is a cross section of a modification located at 7—7 in FIG. 2, relating to part B of the apparatus.
FIG. 8 is a cross section of another modification of the above-mentioned section 7—7 of part B of the apparatus.

In the example illustrated in FIG. 2, part B of the apparatus consists primarily of two tubes 25 and 26 arranged coaxially one within the other. These tubes can be lengthened or shortened as desired, in accordance with a building-block or modular system. It is advisable to compose these tubes of pieces 31 so dimensioned that the tubes can be lengthened or shortened by about 200 to 300 mm. or multiples thereof. The tube pieces can be fixed together by any suitable known means, but they are preferably screwed one into the other. Between the internal diameter of the outer tube 25 and the external diameter of the inner tube 26 there is a longitudinal cavity 47 as narrow as feasible. That is, there is a ring-shaped or circular narrow interspace as can be seen from the cross section 4—4 of FIG. 4. This narrow space may consist of bores 58, as shown in FIG. 7. In FIG. 8 this narrow space consists of a gap 59. Various other shapes and designs of the narrow space are applicable, and they may extend axially or/and radially. The main point is that these spaces are as narrow as possible so that the substance which is pressed and fed therethrough is influenced by the temperature therein in the shortest period of time. That is, the thermoplastic or thermosetting natural or synthetic substances are influenced by the heat of the narrow processing spaces in such a manner that they are plasticized or caused to gel and, in the case of non-ferrous metals, these are brought into liquid state in the shortest interval of time. When producing artificial ice or ice cream, the water or viscous or liquid mixture of the ice cream is influenced by the cold in the narrow spaces and thereby brought into consistent state.

The narrower the width or the bore of the space, the more favorable, quicker and more complete will be the plasticizing or the liquefaction of the thermoplastic or thermosetting natural or artificial substances and the liquefaction of the non-ferrous metals or the conversion of the liquid substance, for example water, into a cold consistent state.

For pulverulent or pasty, viscous or liquid substances the most favorable width of the processing spaces or bores is about 0.5 mm., if this is possible in practice. In any case, the width of interspace, or the diameter of the bores must be kept as small as possible. To press and feed the substance through these narrow, long spaces, and to overcome the counter pressure exerted by the substance, a very heavy continuous pressure is necessary which is applied at a very effective rate of feed. This is ensured by the combination of part A of the apparatus with part B thereof in that the substance is positively pressed and continuously conveyed constrainedly through the part B under heavy pressure and at an effective rate very near the theoretical rate, whereby the counter-pressure is overcome. In this respect the parts A and B of the apparatus conjointly operate as a single pressure and feeding unit.

The passages or spaces 47 may also be provided, along their paths, with long or short constrictions 173, as shown in FIG. 20, in order to compress or stretch and/or knead the substance while it is being conveyed.

The spaces or passages 47 may also be provided at intervals with degassing, deaerating or evaporating bores 45, 46 which operate either automatically or under vacuum.

The inlet and outlet apertures of apparatus part B according to FIG. 2 are each provided with flow-guide members 27, 34 each having a cylindrical base portion and a conically pointed top portion 27a or 35. The member 27 at the inlet aperture is provided with spacers or bridge structures 28 and 29 having a profile and cross section as shown in FIGS. 11, 12 and 13. The member 34 is also provided with spacers or bridge structures 38 and 39, whose profile and cross sections are shown in FIGS. 14, 15 and 16. The bottom parts of these spacers are rectangular.

Any desired number of such spacers may be provided. However it is advisable to provide each guide member with at least three or four. The spacers serve not only for keeping the inner tube 26 and the guide members centrally and coaxially on the tube 25, but also to brace the inner tube 26 against the pressure of the synthetic substance.

The flange 23 and the spacers are provided with a through bore 56 extending perpendicularly to the longitudinal axis of apparatus part B and allowing the passage of the cooling or heating media, such as cold or hot air, water, steam or oil etc. which circulate in the interior of the tube 26 and the interior of the member 27. If, however, the tube 26 and the member 27 are to be heated from the inside by electric heating elements or cartridges, the electric wires or cables for these elements are threaded through the bores 55 of the flange 23 and the spacer 29 in order to connect these cables to the current-supply line. The rectangular parts of the spacers 28 and 29 and the rectangular parts of the other spacers which are located on member 27 are hard-soldered to this member in order to prevent it and the inner tube 26 from shifting in the outer tube 25 under the pressure of the substance.

On the other hand, the upper parts of the spacers, extending through slots in the outer tube 25, are movable in these slots in longitudinal direction so that, when the guide member with the spacers and the inner tube 26 are dissassembled from the outer tube 25, they slide easily in the outer tube 25 and can be detached therefrom.

Furthermore the spacers 38 and 39 and also the other spacers located on the member 34, 35 are neither soldered nor rigidly connected thereto nor to the outer tube 25a. These spacers are axially movable in the guide member 34 and in the slots of the outer tube 25a and are secured and held against the pressure of the substance by the flange 36 which is screwed onto the outer tube 25a. Moreover these spacers are additionally secured against pressure by the part 35 which is screwed at 68 into a threaded bore in the base portion of the guide member 34.

As can be seen from FIG. 2 and the sections of FIGS. 12 and 15, all of these spacers are so constructed that, at the point where the substance is pressed between the spacers into the narrow annular space, they have an aerodynamic shape or the shape of a loom shuttle, so as not to obstruct the feed and the path of the substance.

The flange 36 and the spacer 38 are provided with a vertical through bore 40 which serves for admitting the cooling or heating medium as explained above in connection with the outlet bore.

The vertical bore 57 which is extended through the flange 36 into the spacer serves for introducing a thermostat or other temperature sensor which controls the temperature of the inner tube 26, ring-shaped pieces 31 and the guide member 34.

Extrusion or injection-molding heads and/or nozzles and/or calibrating nozzles or granulating heads or nozzles may be connected to the flange 36.

As mentioned above, the part B of the apparatus not only serves for plasticizing, gelatinating or liquefying or, as above explained, converting into a consistent state the substance pressed and conveyed from the part A of the apparatus, but the part B of the apparatus simultaneously serves, depending upon the object to be attained and the kind of substance being processed, to knead, intimately mix, homogenize and, if necessary, color this substance, and/or intimately and uniformly knead, distribute and admix softeners, stabilizers, lubricants and fillers and dyes in one and the same working operation.

This kneading, mixing and homogenizing process consists in that the substance while passing through the interspaces and/or bores in part B, is passed and pressed through narrower, constricted passages such as indicated at 52, 70 in FIG. 2, in which baffle or obstacle elements are located, such as the rhombic studs, designated by 51, 69 in FIG. 2, or ribs, spokes, bores or the like.

Relative to the flow direction, the baffle elements are set one behind the other, preferably mutually displaced in rows in such a manner that the substance pressed through the passages of the first row is split up irregularly as it passes through the next following passages between the displaced baffle elements of the second row. Due to such displacement of the baffle elements, the synthetic substance, in passing from one passage into the next following passage, is irregularly split up and in the third passage is irregularly reunited under pressure with the synthetic substance emerging from the other passages on the same plane. This positive splitting and merging of the flow of synthetic substance under pressure can be effected in axial and/or radial direction relative to the main axis of the feed path. As a rule, it is preferable to have the splitting and reuniting of the substances by the baffle elements take place in the narrowest and shortest possible passage which is reduced almost to a point or to a very short path at its narrowest place.

At this narrowest place the additional very intensive plasticizing, gelling or liquefaction and the kneading, mixing and homogenizing of the substance takes place. The splitting up of the substance which is located in every passage and is being fed or pressed through every passage, takes place in such a manner that the substance in each passage is split up in axial and/or radial direction into at least two unequal parts, one of which comprises more than half the total volume; this part of the substance is then united with the substance passed through the neighboring passage on the same plane and comprising less than half, for example one third or one quarter of the total volume, and is pressed into the next following passage always in axial and/or radial direction. The splitting up and reuniting of the substance is preferably repeated so many times that the substance in each of the first passages, on account of its being irregularly split up and irregularly reunited, travels at least over one half of the periphery or over the whole periphery of the cross section or diameter of the feed path.

In order to obtain a thorough and effective mixing of synthetic substance, the substance can be divided up unequally and reunited unequally so often that the substance which is in each of the first passages travels several times over the entire periphery of the feed path. At the same time it is important that the temperature of the synthetic substance be regulated by heating and cooling in conjunction with known measuring and control devices. The heating and cooling can be effected in the case of the inner tube 26 and outer tube 25 by known suitable means, for example hot or cold oil, steam, water, air, electric heating or the like.

The baffle elements, such as for example rhombic studs 51 forming between them constricted passages 52 can be shaped as integral parts of the ring-shaped tube pieces 31. However, they may all form part of an integral one-piece body such as a cylinder.

The number of rings 31 and therefore the number of dividing and reuniting operations depends upon the desired degree of mixing, kneading and homogenizing of the substance. The more discs with passages and constrictions or baffle elements are provided, the more intensive will be the kneading, mixing and homogenizing and/or coloring effect.

Any number of baffle elements carried in the same plane by these rings can be provided. The baffle elements or rings can be arranged at any suitable place of part B in the cavities or in the feed passages for the substance. Preferably, however, the baffle or obstacle elements are located in proximity to the outlet aperture of part B where the substance is partly or fully plasticized.

The baffle elements or the passages can all be constructed in the same manner, both as regards their dimensions, thickness and width as well as the distribution of the passages, bores or the rhombic studs, ribs, spokes, or the like obstacle elements. These elements, for example elements 51 or passages 52, may however be constructed differently from each other in any desired manner, both as regards their form and shape and/or their dimensions and especially their thickness or width, as well as the distribution of the passages or rhombic studs 52 shown by way of example, ribs, spokes, narrow bores or the like.

Both the cavities and/or the narrow and constricted passages as well as the baffle elements may extend conically in the direction towards the outlet aperture of part B of the apparatus. The baffle elements are preferably arranged close against the external diameter of the cavities.

The width of the passages or of the baffle elements can be the same along the feed path of the substance or can narrow or widen and again narrow alternately and continually as desired. Similarly the depth or width of the passages and of the baffle elements can increase or decrease, that is be constricted or widened alternately or constantly. If the passages are formed by bores (58 in FIG. 7) and the baffle elements by the solid partitions or webs between these bores, the passages are also divided unequally by the solid partitions between the bores. If necessary these bores are constricted, narrowed or widened as desired.

It is advantageous that the synthetic or other substance which has left the passages be fed into a collecting chamber or a collecting channel 32 which has no baffle elements, and wherein the substance fed and pressed through the passages is again uniformly united and compressed along a certain length of travel. This collecting chamber or channel can be of any desired length, but it is advantageous to make it about 20 to 200 mm. long. Such collecting chambers or channels 32 can be accommodated between the above-mentioned ring-shaped pieces 3 carrying the passages.

To obtain a still more effective mixing, kneading and homogenizing of the substance, the passages may be so shaped as to become progressively narrower, but as far as possible the above-mentioned unequal splitting-up of the substance should be maintained.

For example, a different stack of ring-shaped pieces 33, having narrower passages 70 and having the obstacle elements 69 more closely spaced from each other, is preferably disposed behind the above-mentioned collecting channel 32 so that the substance is again intimately and effectively mixed, kneaded and homogenized. This can be repeated several times, each group of passages being narrower than the preceding one, but in this case, too, the substance in the passages should always be split up unequally, as explained, to secure a very effective kneading, mixing and homogenizing of the material.

As shown at 50 and 50a, the rings 31, 33 and the collecting chambers 32 may be bored, for example, in longitudinal direction at least at one point and firmly interconnected and fixed by pins (not shown) so as to secure these parts from turning. However, the rings may also be interconnected and prevented from turning in some other manner.

Figures 21, 22, 22A:
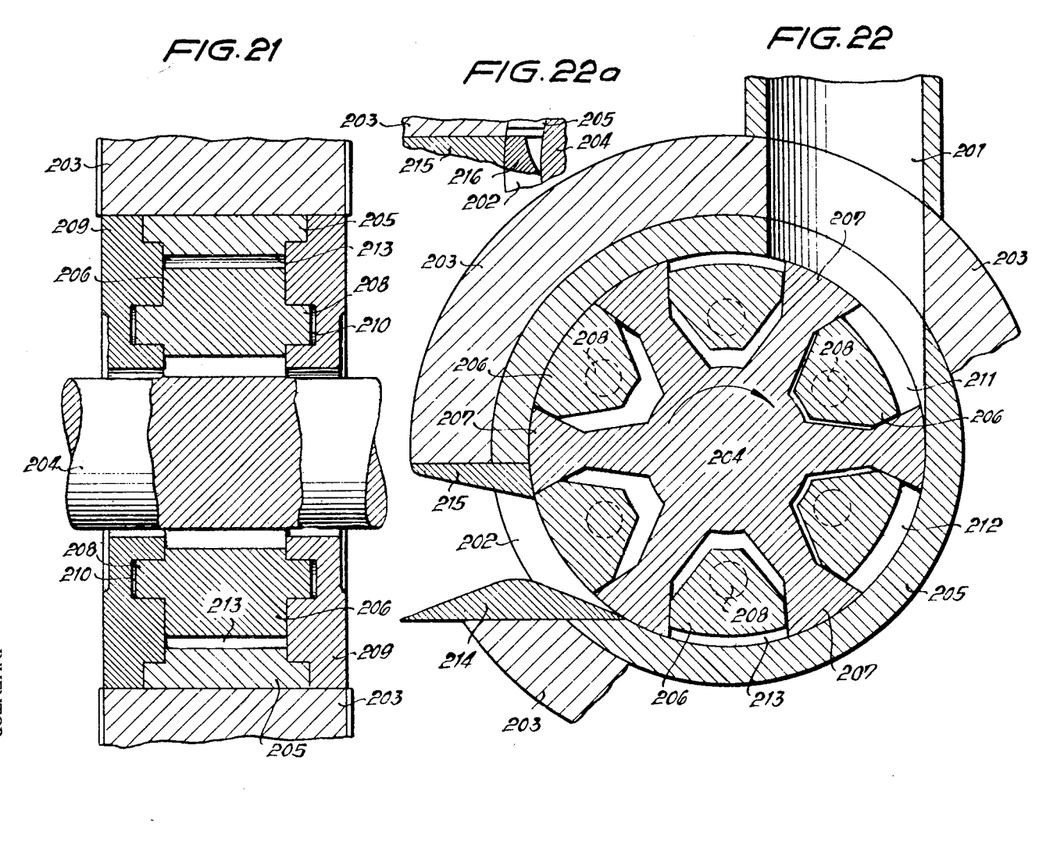
FIG. 21 is a longitudinal section through a modified form of part A of the apparatus according to the invention.
FIG. 22 is a cross section through a modification of the apparatus of FIG. 21.
FIG. 22A is a section through the stripper for the surface of the rotating inner cylinder of FIGS. 21 and 22.

The modified part A of the apparatus shown in FIGS. 21 and 22, which also forms with the part B a single unit, is provided with at least one inlet 201 and at least one outlet aperture 202. The modified part A of the apparatus consists of cylinders fitting closely one within the other. The outer cylinder 203 is stationary. The inner cylinder or rotor 204 is rotatable and can be made in one piece with the driving shaft. The source of power is not shown in the drawing. The internal bore of the outer cylinder is of hollow annular construction and is preferably provided with a stationary inner ring 205 in close sliding fit with the coaxial inner rotatable cylinder or rotor 204.

Both the outer cylinder 203 and the stationary ring 205, as well as the inner rotary cylinder 204 can be cooled or heated by known means, as in the embodiments of FIGS. 1, 3 and 17, 18.

The outer surface of the cylindrical rotor 204 is provided with slidable segmental parts 206 between webs 207 to act as feeding elements. During rotation of the rotor 204, the slidable segments are positively moved to and fro, for example by pins 208 or other known means, in the radial direction of the rotor 204. The positively constrained displacement of the parts 206 is effected by means of eccentric grooves 210 in the pressure sealing discs 209. The pins 208 of the segments 206 move constrainedly in the grooves 210 in accordance with the eccentricity of the grooves.

Due to the positive displacement of the sliding parts 206 toward and away from the axis of the rotor 204, hollow spaces 211 are produced between the outer surface of the slidable parts 206 and the inner surface of the outer cylinder or the stationary ring 205 and the webs 207.

During the rotation of rotor 204 the substance is charged through the inlet 201 with or without pressure into the hollow spaces 211 and, if necessary, is compressed at the same time. In spaces 211 the substance is positively, uniformly and continuously fed in the direction towards the outlet 202 under high pressure and with an effective rate of feed which is approximately equal to the theoretical rate of feed. On reaching the outlet, the substance is pressed out of the hollow spaces 211 by the positive displacement of the parts 206 in the direction towards the surface of the inner cylinder or rotor 204. Thus the substance is constrainedly forced into the outlet 202 and into the inlet of part B of the apparatus which is directly connected up to this outlet aperture. The surface of the segmental parts 206, on arriving at the outlet 202, will have reached the same height as the upper surface of the webs 207 or the inner cylinder or rotor 204. When the segment 206 is in this position the substance will be scraped off, if necessary by means of a scraper 216, from the peripheral surface of the rotor 204 and from the segment 206. While the substance is being fed into the hollow spaces 211 it can be gradually compressed, degassed and/or deaerated in these spaces as shown at 212 and 213 between the outer surface of the segment 206 and the inner surface of the outer cylinder and ring structure.

The substance can also be compressed, degassed or deaerated in the outlet opening 202 or in the inlet opening of part B of the apparatus by means of reversing and deflecting or constricting and/or compressing elements 214 and 215 or by other known means. The obstacle elements 214 and 215 also have the function of uniformly distributing the substance being conveyed in the inlet opening of part B.

The above-mentioned compressing, degassing and deaerating operations may also take place during the feeding of the substance into part B of the apparatus. The further working of the material in part B is carried out in the manner already described.

FIG. 22A shows another deflecting and constricting element at the outlet opening 202. This element is similar to the one denoted by 215, but is provided with a stripper 216 which automatically scrapes the substance off the surface of the rotor 204, the webs 207 and the surface of the segments 206 in the outlet opening 202.

Figure 23:
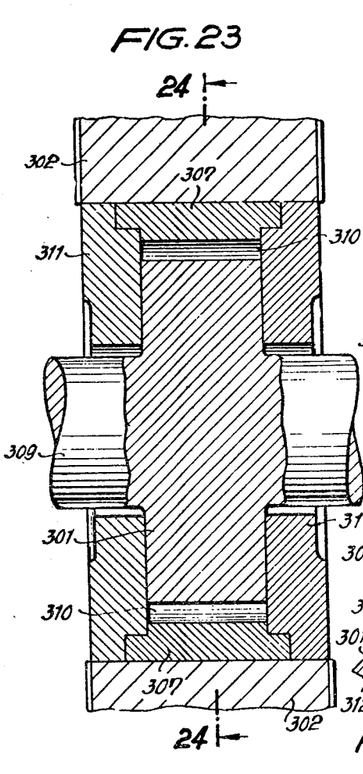
FIG. 23 is a longitudinal section through a further modification of part A of the device for conveying or feeding the material according to the invention.
Figures 24, 25, 26:
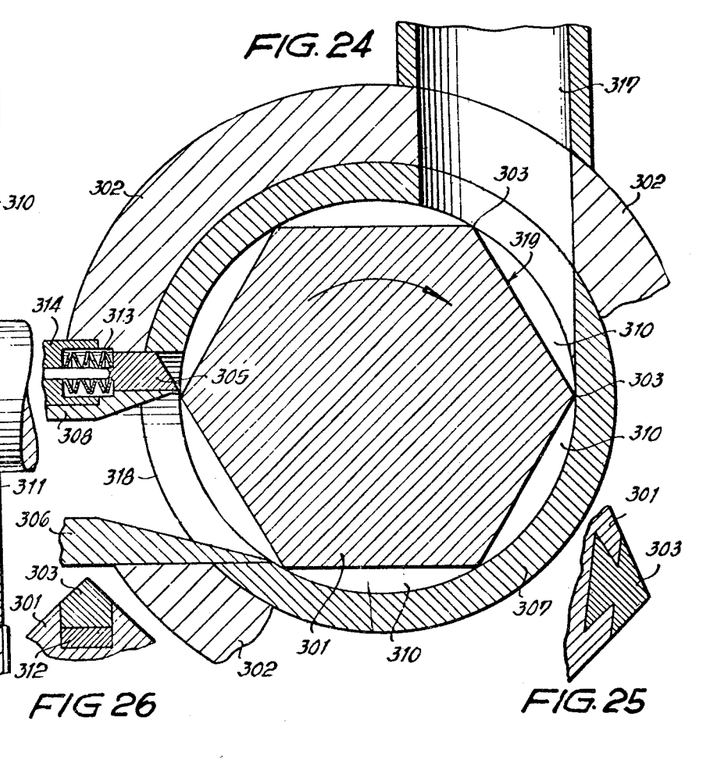
FIG. 24 is a cross section through yet another modification of part A in the apparatus of FIG. 23, and is taken on line 24—24 of that figure.
FIG. 25 shows an edge structure of the rotary inner cylinder shown in FIGS. 23 and 24, which structure may be exchangeable.
FIG. 26 is another embodiment of an edge structure for the rotary inner cylinder of FIGS. 23 and 24, which structure may be exchangeable and is provided with an elastic pressure support.

The modification of apparatus part A according to FIGS. 23 and 24 is also provided with at least one inlet opening 317 and at least one outlet opening 318. This modification comprises two cylinders 302 and 301 tightly fitting and slidably arranged one within the other.

The outer cylinder 302 is stationary. The inner cylinder or rotor 301 is rotatable and can also be made in one piece with the driving shaft 309. The internal bore of the outer cylinder 302 is preferably provided with a stationary inner ring 307.

The inner cylinder or rotor 301 is provided on its external diameter or surface with at least one edge 303 to act as conveying element which, during rotation of the rotor 301, always remains in close contact with the inner surface of the outer cylinder 302 or ring 307. The surface of the rotor 301 may also have a relatively large number of such conveying edges, as shown in FIG. 24. These edges of rotor 301 form hollow spaces 310 between the rotor and the inner bore of the ring 307. Straight faces may be formed between the edges 303 as shown at 319. These intermediate faces, however, may be convex or concave. That is, the faces 319 may be curved inward or outward or be trapezoidal.

The material which is introduced from the inlet 317 with or without pressure in the direction of the outlet 318, enters the hollow spaces 310 under heavy pressure and at an effective rate of feed approximately equal to the theoretical rate. The hollow spaces 310 thus forcefeed the material towards the outlet 318. When the material reaches the outlet opening, it is scraped off the faces 319 and the edges 303 by at least one stripper 305. The stripper can be actuated and resiliently pressed magnetically, mechanically and/or electromagnetically or hydraulically and/or by direct or indirect pressure on the stripper or by suitable other means. The material is then fed and forced under the same pressure into the outlet opening 318 and into the inlet opening of part B connected with the outlet aperture, thus being compressed, degassed or deaerated by means of deflecting, reversing and/or constricting or compressing elements 306 and 308 in the inlet opening of apparatus part B.

The stripper 305 is biased by plate springs 313 compressed by means of a cover 314. As mentioned, various other devices may be used for actuating the stripper 305 and pressing it against the rotor 301. The stripper or strippers 305 can be arranged perpendicularly or at a slant or in any other position in relation to the surface of the rotor 301.

FIG. 25 shows an exchangeable edge-type feeding element 303 of the rotor 301 which may be made from other material than the rotor.

FIG. 26 shows an exchangeable edge element 303 of the rotor 301 which is provided with a resilient or elastic pretensioned cushion 312 consisting of a spiral or plate spring, rubber or synthetic rubber strips or some other resilient or elastic means.

Consequently the edge-type feeding elements are always in close contact with the inner surface of the outer cylinder 302 or stationary ring 307.

The inner cylinder or rotor of FIGS. 1–3, 17–18, 21–22 and 23–24 may be rotated in the direction opposed to that indicated by the arrows, provided the necessary measures are taken for feeding the material in the direction towards the outlet opening.

The length of the part B of the apparatus is primarily dependent upon (1) The suitable plasticizing temperature of the particular material to be processed;

(2) The throughput speed of the material through the narrow constricted passages in part B of the apparatus; and (3) The dimensions of the passages mentioned in item 2.

The greater the volumetric discharge of material per unit of time from part A of the apparatus, the longer must be the length of part B so that the material on leaving the part B is completely plasticized in the case of synthetic substances, liquefied in the case of nonferrous metals, or converted into ice in the case of water. If, for example, it is desired to process about 80 kg. per hour of pulverulent, softener-free polyvinyl chloride which must be completely plasticized, the length of the part B must be between 60 and 120 cm. in an apparatus which, as shown for example in FIG. 2, comprises two coaxial hollow cylinders with an intermediate annular passage of 1 to 2.5 mm. gap width. This length is also dependent upon whether baffle elements are arranged in part B, and upon the number of discs which carry these baffle elements.

The output of synthetic substance is not dependent upon the length of part B but depends upon the dimensions of the feeding spaces and the number of revolutions of the inner cylinder of part A. For example, in order to obtain the above output, the external diameter of the inner cylinder 4 (or 101) which carries the six blades 5 (or the pairs of blades 109a, 109b and 109c) is preferably about 200 mm., the cylinder and the blades having a width of about 60 to 80 mm. For such an output, the maximum depth of the crescent-shaped space between the external diameter of the inner cylinder and the internal diameter of the ring or of the outer cylinder is preferably about 8 to 10 mm., and the inner cylinder is to be rotated at about 20 to 30 revolutions per minute.

As mentioned above, the cylinders of the conventional worm or screw presses are gradually heated, zone by zone, to a higher temperature. Contrary hereto, the heating of the inner and outer tubes 26 and 25 in the part B of the apparatus according to the invention need not be by zones, and the temperature need not be progressively increased up to the end of the apparatus. It is sufficient to adjust part B of the apparatus to the temperature suitable for working the particular material to be processed. The material will gradually attain its suitable temperature before it leaves the part B because part B does not have any rotating parts as in the case of screw presses so that zonal heating is not necessary. Preferably, the temperature of the inner and outer tubes is kept uniform. The part B of the apparatus can be brought to the proper temperature, suitable for the synthetic material to be worked, along its entire length or a portion thereof, and can be controlled by cooling to remain, for example, at about 170° to 200° C. in the case of the above-mentioned synthetic substances. Consequently, the devices for controlling the different zone temperatures necessary for screw presses, can be omitted. If the synthetic substance from part A of the apparatus is introduced into part B of the apparatus in cold state, the positive compression, pressing and feeding of the material in the thin and narrow passages of part B will gradually bring the material to the temperature suitable for its plasticization before it is discharged. If, however, the synthetic substance leaving part A is in the preheated state, when being pressed into part B, the length of part B can be shortened. If a larger discharge output is to be obtained, the sections of the passages in part B of the apparatus, which are built up in acordance with a building-block or modular system, can be lengthened as required by adding more prefabricated tube elements, whereby the temperature of the added tube elements is maintained at about 170 to 200° C. for working the above-mentioned pulverulent, softener-free polyvinyl chloride. If, however, it is desired to obtain a greater output per unit of time without increasing the length of part B, the internal and external temperatures of part B must be raised accordingly, for example from about 170 to 200° C. to about 250 to 300° C., always as required to have the synthetic substance leave the outlet opening of part B at a temperature of about 170 to 180° C. To increase the temperature of part B in the proper ratio to the quantity to be discharged, the temperature of the synthetic substance on leaving the outlet aperture, the extrusion or die-casting head or nozzle can be controlled so that the internal and external temperatures of part B can be adjusted accordingly and the synthetic substance will not be overheated during the conveying operation. For this reason, it is advantageous to provide a temperature feeler or thermostat, which directly and constantly checks the temperature of the synthetic substance itself as it passes through the spaces or the narrow constricted passages or in the proximity of the outlet aperture or in the outlet opening of part B itself.

The above-mentioned baffle elements with their passages may also be used in the outlet opening of a conventional screw press or in the extrusion heads, or in the heating vessel or torpedo of a die-casting machine, in order to effect a kneading, intimate mixing and homogenizing of the material or synthetic substance.

I claim:

1. Apparatus for working and extruding synthetic plastic material to produce a shaped product in a single continuous operation, comprising:

(a) a pressure feeder portion for feeding said material at a pressure of at least about 200 atmospheres, said feeder portion having a housing with an inlet opening for receiving the material in non-plastic condition and an outlet opening, said feeder portion having positive-displacement means rotationally mounted in said housing and forming pressure chambers in sequential communication with said inlet opening and with said outlet opening to entrain the material and force it through said outlet opening at said feed pressure;

(b) a fixed processing portion comprising two elongated and concentric tubular structures forming between each other a narrow annular space whose length in the flow direction of the material is a multiple of that of said respective compression chambers, said space communicating at one end with said outlet opening to receive material under pressure therefrom;

(c) groups of obstacle members distributed in said annular space and extending across the radial width of said space, said members being offset circumferentially and longitudinally relative to one another and forming together a multiplicity of interstitial constrictions and subsequent enlargement in the flow path of the material for simultaneously kneading and mixing the material by directionally changing, subdividing and recombining its flow through said space, said group of members covering in totality an axial length which is a multiple of the diameter of said annular space;

(d) said processing portion having heat exchange means joined with each of said two tubular structures for thermally treating the material as it passes through said space to convert the material to plastic condition within the space;

(e) an extrusion nozzle connected to said processing portion at the exit thereof for issuing a shaped strand of said material; said pressure feeder portion and said processing portion being firmly connected with each other to jointly form a single machinery unit.

2. In an apparatus according to claim 1, said feeder portion comprising two members concentrically disposed one in the other, of which the outer one forms said housing and has a cylindrical inner surface, and the inner one is rotatable and forms part of said positive-displacement means; said rotatable inner member having a peripheral surface of generally polygonal shape whose edges protrude toward said cylindrical surface and are in sliding engagement therewith between said inlet and outlet openings, a scraper mounted in said housing near said outlet opening and movable toward said inner cylinder, and spring means engaging said scraper and holding it in constant engagement with said peripheral surface of said inner member for stripping therefrom the material and deflecting it into said outlet opening.

3. In apparatus according to claim 1, each of said two concentric tubular structures of said processing portion comprising a number of substantially ring-shaped components coaxially joined with each other, whereby the axial length of said processing portion can be changed by changing the number of said components, each group of said obstacle members being located around the periphery of one of said ring-shaped components and rigidly joined therewith.

4. In apparatus according to claim 1, said obstacle members being integral with said tubular structures of said processing portion and subdividing said annular space into channels parallel to the axis of said tubular structures.

5. In apparatus according to claim 1, said obstacle members having individually rhomboid shape elongated in the longitudinal direction of said annular space and having an individual length which is a fraction of the diameter of said annular space.

References Cited by the Examiner

UNITED STATES PATENTS

| | | | |
|---|---|---|---|
| 1,537,348 | 5/25 | Grossmann | 18—12 XR |
| 2,669,750 | 2/54 | Keeney | 18—30 |
| 2,740,160 | 4/56 | McKee et al. | 18—30 |
| 2,779,972 | 2/57 | Kins | 18—30 |
| 3,045,283 | 7/62 | Keiser. | |

FOREIGN PATENTS

| | | |
|---|---|---|
| 521,706 | 7/21 | France. |
| 148,996 | 10/21 | Great Britain. |

ROBERT F. WHITE, *Primary Examiner.*

WILLIAM J. STEPHENSON, ALEXANDER H. BRODMERKEL, *Examiners.*